United States Patent [19]

Kresge

[11] 4,243,622
[45] Jan. 6, 1981

[54] METHOD FOR MANUFACTURING ZINC OXIDE VARISTORS HAVING REDUCED VOLTAGE DRIFT

[75] Inventor: James S. Kresge, Pittsfield, Mass.
[73] Assignee: General Electric Company
[21] Appl. No.: 967,196
[22] Filed: Dec. 7, 1978

Related U.S. Application Data

[63] Continuation of Ser. No. 836,765, Sep. 26, 1977, abandoned.

[51] Int. Cl.³ .............................................. C04B 33/30
[52] U.S. Cl. ..................................... 264/66; 264/345
[58] Field of Search .................. 264/61, 340; 252/518; 214/66, 345

[56] References Cited

U.S. PATENT DOCUMENTS

| 4,046,847 | 9/1977 | Kresge | 264/61 |
| 4,165,351 | 8/1979 | May | 264/61 |

Primary Examiner—John Parrish
Attorney, Agent, or Firm—Francis X. Doyle; Richard A. Menelly

[57] ABSTRACT

Zinc oxide varistors are thermally treated, after sintering, at temperatures between 400° C. and 800° C. in air for a period of one to ten hours. The thermal treatment apparently removes residual strains resulting from the sintering process and substantially reduces voltage drift.

7 Claims, 2 Drawing Figures

U.S. Patent    Jan. 6, 1981    4,243,622
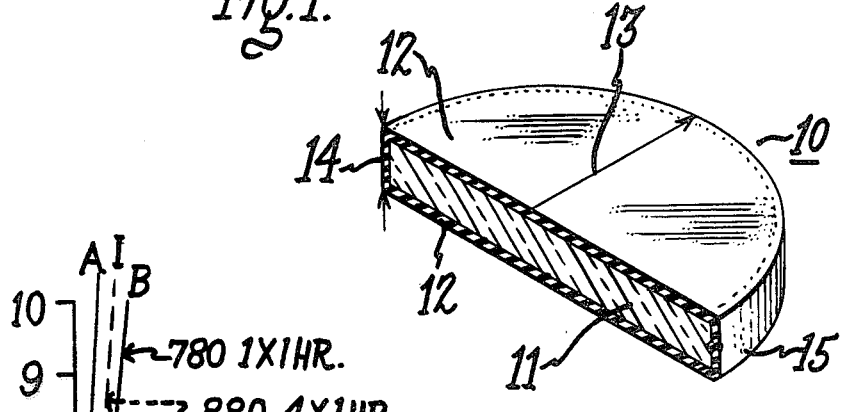
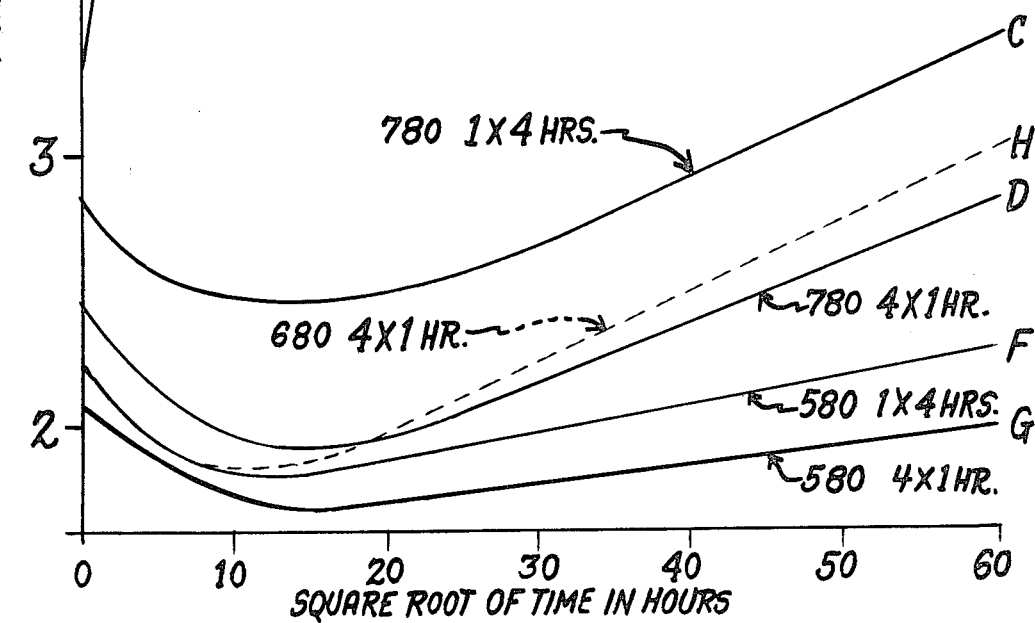

METHOD FOR MANUFACTURING ZINC OXIDE VARISTORS HAVING REDUCED VOLTAGE DRIFT

This is a continuation, of application Ser. No. 836,765, filed Sept. 26, 1977 now abandoned.

BACKGROUND OF THE INVENTION

Zinc Oxide varistors are finding increasing usage as replacements for silicon carbide voltage surge protection devices. Silicon carbide devices however, require series voltage gaps to prevent the silicon carbide material from being damaged during a voltage overload condition. With zinc oxide devices it is theoretically possible to substitute the zinc oxide resistance elements for the silicon carbide element without the series voltage gap. To date the use of zinc oxide varistors without sparkgaps has not proven feasible because of the change in the electrical characteristics of the zinc oxide varistor under subjection to a continuous source of A.C. potential. The continuous application of A.C. voltage to the zinc oxide varistor causes the leakage current through the zinc oxide to increase over a period of time. The increase in the zinc oxide varistor leakage current beyond a relatively low value may cause disc failure by the mechanism of thermal runaway at normal operating voltages.

For the purpose of this disclosure the increase in the varistor leakage current under the influence of A.C. voltage is defined as "A.C. drift".

U.S. Pat. No. 3,928,245 issued Dec. 23, 1975, describes one method for manufacturing an improved zinc oxide varistor having decreased A.C. drift. The improvement is believed to be due to the addition of the oxides of barium and boron to the basic zinc oxide and bismuth oxide compositions also containing silicon oxide. Varistors manufactured using the described oxide additives showed fairly stable leakage current values out to 200 hours of operation before the leakage currents began to increase under the influence of the continuously applied A.C. voltage.

U.S. Pat. No. 4,046,847 filed Dec. 2, 1975 and entitled "Process for Improving the Stability of Sintered Zinc Oxide Varistors" discloses a method for further improving zinc oxide varistor leakage current stability out to approximately 900 hours before the varistor leakage current begins to increase. The aforementioned method treats the sintered zinc oxide varistor by cooling the varistor immediately after sintering to a temperature below 400° C. and reheating the varistor up to a maximum of 700° C., recooling the varistor down to 400° C. and recycling the reheating and recooling process.

It has been discovered that zinc oxide varistors can be rendered stable over extended periods of time without the need for recycling when the time and temperature parameters are carefully chosen for a particular resistor composition and configuration. It has also been discovered that the maximum effective temperature is in the order of 800° C. rather than 700° C.

SUMMARY OF THE INVENTION

The invention comprises a method for manufacturing zinc oxide varistors having stable operating characteristics. The invention further comprises a method for treating zinc oxide varistors to reduce the effect of A.C. voltages on the varistor leakage currents.

According to the invention zinc oxide varistors containing small concentrations of the oxides of barium, boron and silicon are heated in air to a temperature of from 400° to 800° C. for a period of from one to ten hours and are slowly cooled to room temperature.

An object of the invention therefore is to provide zinc oxide varistors having stable long-range operating characteristics by rendering the varistors relatively insensitive to A.C. drift effects.

BRIEF DESCRIPTION OF THE DRAWINGS

FIG. 1 is a section perspective view of a zinc oxide varistor according to the invention;

FIG. 2 is a graphic representation of the watts loss as a function of time in a temperature accelerated aging test on 60 Hz A.C. voltage excitation for varistors according to the invention.

GENERAL DESCRIPTION OF THE INVENTION

The invention resides in a method for thermally treating sintered zinc oxide varistors for possibly removing any residual strains which might have occurred during the sintering process. The stresses remaining in the zinc oxide structure after sintering are believed to be in part accountable for the A.C. drift phenomonon. A series of annealing schedules were undertaken in order to determine whether the cycling times for heating and cooling could be optimized to reduce the A.C. drift effects for extended periods of time. For control purposes a plurality of heating steps were performed at specified temperatures and time durations with and without thermal recycling to determine to what extent recycling is required in the annealing process.

During the course of these experiments it was discovered that reheating and recooling the sintered zinc oxide varistors at high temperatures for several cycles was not essential for promoting A.C. stability. It was also discovered that effective thermal treatment for enhanced A.C. stability can be achieved at temperatures as high as about 800° C. whereas the limit was previously thought to be about 700° C.

DESCRIPTION OF THE PREFERRED EMBODIMENT

The zinc oxide varistor 10 of this invention can be seen in FIG. 1. The varistor 10 is in the form of a disc of circular configuration and is defined as having a major and minor dimension. The major dimension for the embodiment 10 of FIG. 1 is defined by the radius 13 and the minor dimension is the thickness 14 although it is to be clearly understood that zinc oxide varistors can be prepared according to the invention having the geometry of a cylinder such that the length of the cylinder can be equal to or greater than the radius. A pair of electrodes 12 are coated on opposing surfaces of the disc 10 and an insulating coating 15 is applied to the perimeter of disc 10. The sintered zinc oxide composition 11 is prepared in the following manner.

Approximately 50 lbs. of a powder having the composition 95.7% zinc oxide, 0.5% each of bismuth trioxide, cobalt trioxide, manganese dioxide, and chromic oxide, 1% nickle oxide, 0.1% each of barium carbonate, boron oxide and silicon dioxide, and 0.003% aluminum nitrate was prepared by mixing and blending techniques. The powder was then pressed into a plurality of individual discs 10 resulting in sintered discs having a radius 13 equal to about 3.45 cms., and a thickness 14 of about 2.25 cms. The weight per disc ranged approximately between 550 to 575 grams.

After pressing, each of the discs is then sintered at about 1250° C. for five hours in air to form a compact varistor body which is then slowly cooled at a rate of about 100° C. per hour. The electrodes 12 and insulating material 15 are applied to the disc 10 after sintering. It is to be noted that the dimensions of the disc change during the sintering operation.

Zinc oxide type varistors have various applications depending upon power requirements. The geometry of the varistor configuration may vary substantially depending upon the application requirements. For voltage arrester stability it has been determined that the critical dimension is the minor dimension, for example the thickness, when the voltage arrester is disc shaped. If the zinc oxide varistor is a long cylinder having its length as a major dimension and its radius as a minor dimension, then the minor dimension being the radius has more of an effect on the varistor stability than its length. Thus the thermal annealing results discussed herein apply to discs 3.45 cm in diameter and 2.25 cm thick and would not necessarily be directly applicable to discs of other dimensions.

As described earlier, residual strain remaining in the varistor body after sintering can possibly effect the susceptability of the varistor to AC drift. In order to render the varistors more resistant to A.C. drift effects the varistors were heated in air to a range of temperatures and held at the various temperatures for periods of time sufficient to relieve the residual strains. The varistors were then slowly cooled from their annealing temperatures to room temperatures in order to avoid the reoccurrence of strain due to differential thermal effects.

The AC drift, or increase in leakage current over a period of time under an AC stress condition, is temperature sensitive and the drift phenomena occurs at a much faster than normal rate if the temperature of the device is held at higher than normal temperatures. It has been determined by experiment that the time required for a specific increase in leakage current to occur under a given AC stress condition is halved for each approximately 6° C. rise in temperature. Thus, in order to accelerate the process and obtain useful data in a reasonable time the stability tests were made at normal AC excitation voltage, but at an increased temperature of 115° C. instead of at the more normal maximum operating temperture of about 60° C.

In order to measure the increase in leakage current during the application of AC voltage, the varistor watts loss value was measured initially and over extended periods of time in approximately 1- to 500-hour increments. The watts loss value was determined by measuring the wattage value upon application of a fixed AC voltage so that the leakage current through the varistor could be determined. AC watts were used as the indicating parameter to provide a measurement related to the leakage current without removing the varistor from the continuous AC stress condition. Removal of the varistor from the AC stress condition causes the leakage current to decrease and could lead to confusing results. It was noted during the long-range testing of the effects of thermal annealing on AC drift that the degree of decrease of the initial leakage current, as determined by the initial watts loss value, was a fairly good indication of the degree to which the varistor watts loss value remained at a low value upon continuous application of AC voltage for a fixed varistor composition.

The thermal threatment consisted of heating the varistors after sintering to a range of temperatures from 400° to 980° C. for a period of time from 1 to 4 hours and then slowly cooling the varistors to room temperature. FIG. 2 shows the relationship between the actual measured watts loss as a function of the time at the elevated temperature of 115° C. and under an AC stress for differing increments of time and temperature of annealing. Curve A shows the increase in actual watts loss with time for varistors previously measured directly upon sintering with no further thermal treatment. Curve B is the relationship for varistors thermally treated in air at 780° C. for one hour and Curve C is the relationship for a batch of varistors treated at 780° C. for 4 hours. The difference between Curves B and C are indicative of the effect of the annealing time on the reduction of actual watts loss. Curve D is the relationship for a batch of resistors thermally treated in air by cycling the temperature between 400° C. and 780° C. for a total of four cycles, and holding the 780° C. temperature for 1 hour during each cycle. Curve D shows a somewhat lower watts loss and also a slightly decreased rate of change of watts loss than does Curve C. The difference between Curves D and C are indicative of a marginal improvement in stability attained by cycling the temperature during the heat treatment process. Curve E is the relationship for a batch of varistors thermally treated in air at 580° C. for 1 hour and Curve F is the relationship for a batch of varistors treated at 580° C. for 4 hours. Curve G is the relationship for thermal treatment at 580° C. but thermally cycling between 400° C. and 580° C. a total of four times, holding 580° C. for one hour each time. It is to be noted that the treatments at 580° C. are superior in each case to the comparable treatment at 780° C. in that the watts loss values are lower and they increase less rapidly (are more stable). Also it is to be again noted that the four-hour treatment is far superior to the one-hour treatment and the cycling treatment (4 times with one hour each at 580° C.) is marginally more effective than the single treatment for four hours. Curve H is the relationship for a batch of varistors thermally treated by cycling between 400° C. and 680° C., and holding 680° C. for one hour each time. The stability obtained by treatment at 680° C. is inferior to that obtained by treatment at 580° as is evidenced by the steeper slope of Curve H compared to Curve G and it is comparable but slightly less stable than the condition achieved by treatment at 780° C. as is evident by comparing Curves H and D.

Curve I is the relationship for a batch of varistors thermally treated by cycling between 400° C. and 880° C., and holding 880° C. for one hour each time. Treatment at 880° C. is seen to be essentially ineffective as evidenced by the high initial watts loss and by the very fast drift in watts loss with time.

Although not shown on FIG. 2, tests were also made on discs thermally treated by cycling between 400° C. and 980° C. with results no better than those at 880° C.

In summary then it was shown that varistors can be thermally treated to reduce the initial watts loss and to very substantially reduce the rate of increase of watts loss with elapsed time under a constant AC voltage stress at annealing temperatures between 480° C. and 880° C. It is to be noted that thermally cycling the varistor for a number of cycles up to the desired annealing temperatures appears to have a marginally greater effect on the varistor stability than holding the varistor at the annealing temperature for the equivalent amount of time. Also, although a significant effect on stability is obtained by annealing at 780° C. or 680° C., an even greater improvement is obtained at 580° C. These tests showed that annealing at 880° C. or above is essentially ineffective and previous tests have shown that annealing at 480° C. or below is also essentially ineffective. To be effective, the time the varistor is held at the annealing temperature should exceed one hour, with four hours being very satisfactory. Previous tests have shown that annealing for beyond about 10 hours results in no significant further improvement.

As described earlier, the varistor composition included the oxides of boron, barium and silicon in approximate equimolar quantities. It is advantageous to manufacture varistors having increased silica content. As described in the aforementioned U.S. Pat. No. 3,928,245 additions of boron oxide and barium oxide are necessary to provide the silica-doped varistors with fairly stable operating characteristics. The instant invention further embodies varistors manufactured having oxides of silicon, barium and boron ranging in composition from 0.01 to 10.0 mole percent. For the inventive method of annealing varistors of varying geometries, it has been determined that the minor dimension greatly affects the varistor voltage stability, as described earlier, and that the degree of thermal treatment could depend to some extent upon the minor dimension.

Although the method of annealing zinc oxide varistors for the purpose of reducing voltage drift is directed to varistors of the type used for voltage surge protection purposes this is by way of example only. The method of heat treatment of zinc oxide varistors to reduce A.C. drift finds application wherever such A.C. drift stabilized varistors may be employed.

What I claim as new and desire to secure by Letters Patent is:

1. A method for treating a zinc oxide varistor after sintering to reduce voltage drift comprising steps of:
   heating the varistor for not more than one cycle in air at a temperature range from 580° to 750° C. for a period of from two to six hours; and
   cooling the varistor to room temperature at a rate of from 50° to 200° C. per hour.

2. The method of claim 1 wherein the heating is provided at a rate of from 50° to 200° C. per hour.

3. The method of claim 1 wherein the varistor contains at least one of the materials selected from the group consisting of boron oxide and barium oxide.

4. The method of claim 3 wherein the varistor further contains silicon dioxide.

5. The method of claim 4 wherein the boron oxide and barium oxide each comprise from 0.01 to 10.0 mole percent.

6. The method of claim 4 wherein the silicon dioxide comprises from 0.1 to 10.0 mole percent.

7. A process for manufacturing a zinc oxide varistor having stable-operating characteristics comprising the steps of:
   providing a mixture of zinc oxide, and at least one of the oxides selected from the group consisting of barium oxide, boron oxide, and silicon dioxide;
   sintering the mixture at a temperature of at least 1000° C. for a period of at least one hour to form a unitary varistor body;
   reducing the temperature of the varistor body to 400° C.
   heating of the varistor body for not more than one cycle in air to a temperature of from 580° to 750° C. for a period of two to six hours; and
   cooling the body to room temperature at a rate of from 50° to 200° C. per hour.

* * * * *